June 6, 1967     G. V. HEDSTROM     3,323,844
DIFFERENTIAL GEAR ASSEMBLY AND LOCKING MECHANISM
Filed Feb. 24, 1965     2 Sheets-Sheet 1
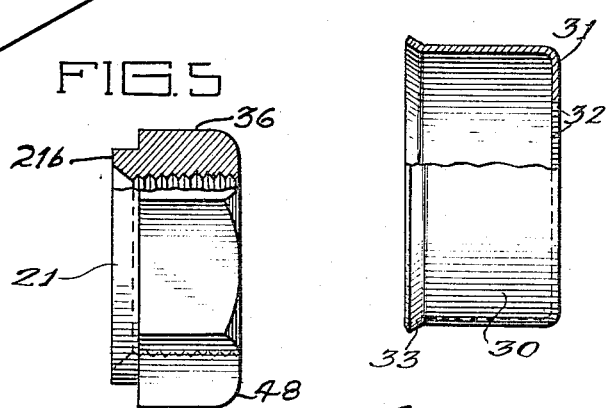
INVENTOR
GUSTAV V. HEDSTROM
BY Carl J. Barbee
ATTORNEY

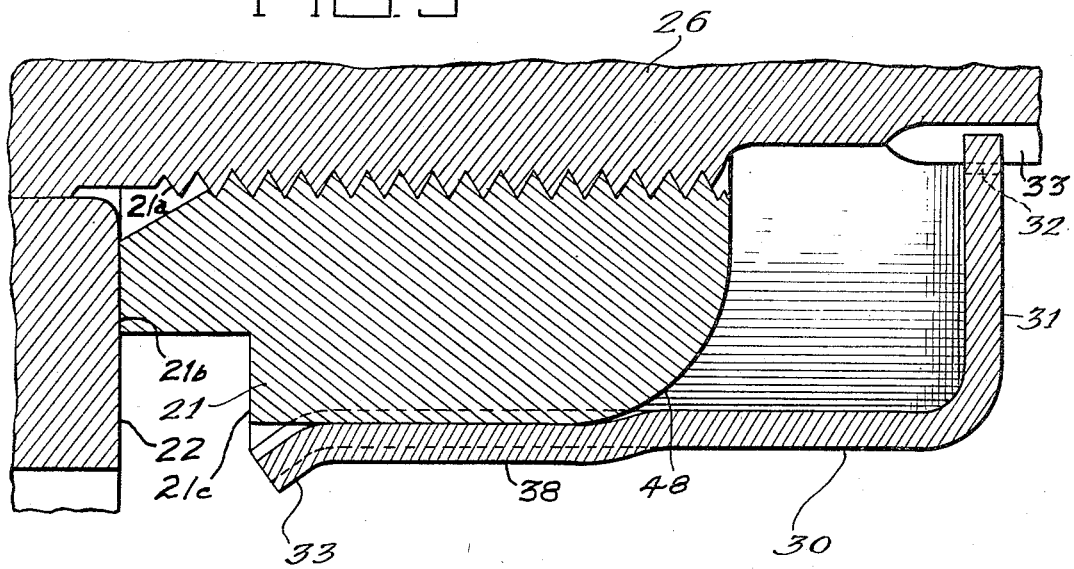
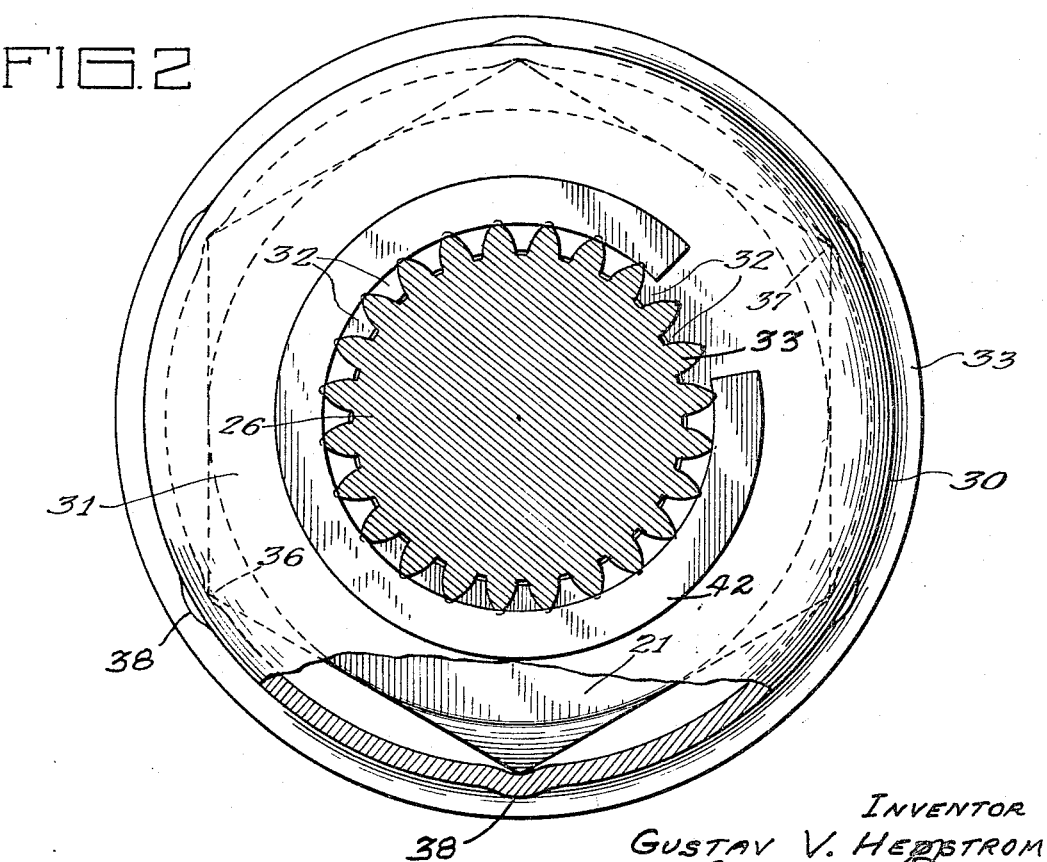
INVENTOR
GUSTAV V. HEDSTROM
ATTORNEY 3,323,844
DIFFERENTIAL GEAR ASSEMBLY AND
LOCKING MECHANISM
Gustav V. Hedstrom, Kenosha, Wis., assignor to American Motors Corporation, Kenosha, Wis., a corporation of Maryland
Filed Feb. 24, 1965, Ser. No. 434,892
7 Claims. (Cl. 308—189)

ABSTRACT OF THE DISCLOSURE

The invention comprises a differential gear assembly of the type used in automobiles. The pinion gear of the assembly has a shaft portion supported by spaced roller bearings. A pre-determined axial thrust load is imposed on the bearings and such pre-load condition is maintained as the result of a locking mechanism coacting with the inner race of one of the bearings.

---

The invention relates to a differential gear assembly for an automotive vehicle in which preload of the pinion shaft bearings is accurately maintained during assembly by means of an improved locking mechanism.

The conventional non-locking differential gear assembly for a vehicle includes a case rotatably mounted in the assembly housing. The case, in turn, contains rotatably mounted differential pinions and differential side gears for engagement with the axle shafts. A ring gear is fixedly secured to the exterior of the case. A drive pinion engages and drives the ring gear and case. The pinion is located on one end of the pinion shaft and is usually integral therewith. The other end of the shaft extends outside the housing and by virtue of splines located thereon is adapted to be engaged and driven through a conventional universal joint. Between the pinion and the splined end of the shaft are positioned roller bearings which rotatably support the pinion shaft in the housing. Shims are used between the housing and the bearing cup adjacent the pinion to assure proper mating of the pinion and the ring gear.

The pinion shaft bearings are preloaded to compensate for expansion due to heat and loads of operation. This is accomplished by the use of a pinion nut in conjunction with shims which are located between the shaft shoulder and the inward side of the cone of the roller bearing that is adjacent the splined end of the pinion shaft. A thrust washer and a lock washer are located between the roller bearing cone and the pinion nut on the pinion shaft. Both washers have flat internal surfaces that engage a suitable flat in the threaded portion of the pinion shaft to prevent relative rotative motion therebetween. After the tightening of the nut on the shaft thread with a torque wrench, a tool is then placed on the vertically positioned shaft to measure the amount of torque needed to turn the pinion shaft in the housing. If the preload is too high, the shim thickness is increased and if too low, the shim thickness is decreased. At the desired preload, one or more of the several ears of the lockwasher are bent over the hex surface of the nut to lock same to pinion shaft. The balance of the differential gear assembly is then installed.

While the above noted assembly operates in fairly satisfactory fashion, it has been noted that the lockwasher in association with the pinion nut does not always locate the nut in the exact position so as to obtain the desired preload. That is, the ear or ears of the washer do not consistently fit tightly to the nut and also the lockwasher itself moves on the shaft until restrained by the aforementioned flat surface. Consequently, the nut moves relative to the shaft during vehicle operation until all the clearance has been exhausted before being restrained by the lockwasher. The preload on the bearings is thus not the same as was originally obtained with the torque wrench. Further, the machining of a flat on the pinion shaft thread, the provision for a thrust and a lockwasher and the adjusting of shims substantially increases the cost of the assembly.

Applicant has developed a differential gear assembly that eliminates the above noted disadvantages. Applicant has replaced the preload shims for the shaft bearings with a collapsible spacer to account for manufacturing tolerances. Applicant also has eliminated the flat on the shaft, the lockwasher and the standard nut and replaced same with a nut and associated locking mechanism of unique design. After the preload condition on the pinion shaft bearings is accurately determined and established, a locking mechanism is employed which will assure that such preload condition is not disturbed during final assembly of the differential gear assembly and during subsequent operation of the vehicle.

The principal object of the invention then is to provide a differential gear assembly in which pinion shaft bearing preload is accurately established and then accurately maintained thereafter by means of a novel locking mechanism.

A specific object is to provide a novel locking washer for coaction with the retainer nut which is threaded onto the threaded portion of the pinion shaft.

Other objects and advantages of the invention will be apparent from the ensuing specification and appended drawings in which:

FIGURE 1 is a sectional plan view of a typical differential gear assembly employing the novel locking mechanism.

FIGURE 2 is a greatly enlarged sectional view taken on the line 2—2 of FIGURE 1 with parts broken in section and with certain background parts removed.

FIGURE 3 is a greatly enlarged fragmentary sectional view showing a portion of the retainer nut and locking mechanism associated therewith.

FIGURE 4 is an actual size end view of the retainer nut alone.

FIGURE 5 is an actual size side elevational view, partly in section, of the nut of FIGURE 4.

FIGURE 6 is an actual size side elevational view, partly in section, of the lockwasher which is employed in conjunction with the retainer nut.

FIGURE 7 is an actual size end view of a lock ring which may be employed.

In general, the differential gear assembly for an automotive vehicle includes a pinion gear A which meshes with ring gear B which is secure with the carrier C which drives the axle shafts D and E through the medium of the gear cluster which is housed within the gear carrier C. The shaft portion of the pinion gear is rotatively supported by the inner and outer bearings F and G and a locking mechanism H permanently holds the pinion gear under a pre-established, preload condition on the bearings F and G.

In a conventional differential gear assembly, the axle shafts D and E are splined at their ends 10 and 11 for driving engagement with axle shaft gears 12 and 13. The idler gears 13 and 14 are rotatably carried on the pin 15 which is secure with the ring gear carrier C. A thrust block 16 is interposed between the ends of the axle shafts and is provided with a central bore through which the pin 15 passes. The ring gear B which is secured to the carrier by bolts 17a has its teeth 17 in mesh with the teeth 18 of the pinion gear. In practice, the teeth of the ring gear and pinion gear are of the spiral bevel type for better performance and quieter operation. The opposite ends of the gear carrier are rotatively carried in bearings 45 and 46 which are held in place by removable bearing caps 45a and 46a. The assembly of the gear carrier C in its bearings is accomplished after the assembly of the pinion in bearings F and G is consummated.

The bearings F and G are mounted in suitable annular bearing seats 39 and 40 formed in the extension portion 19 of the differential housing 20. A shim 40a may be used to establish the desired axial position of the pinion gear 18 with reference to the axis of the axle shafts D and E. After the pinion gear is mounted in the desired position relative to the bearings, then the desired preload on the bearings is obtained by tightening the internally threaded nut 21 on the externally threaded portion 21a of the pinion shaft. The end wall 21b of the nut engages the inner race 22 of bearing F thereby imposing an opposite axial thrust on the inner race 24 of bearing F, which inner race bears against the annular shoulder 25 on the pinion gear. Since, the inner races of each of the bearings are, in effect, being drawn toward each other as a result of the tightening of the nut 21, a predetermined, preload condition is imposed upon the bearings. This condition is accurately determined by a torque indicating tool. A collapsible annular washer 40b is interposed between the annular shoulder 25b on the pinion shaft and the end wall of inner bearing race 22. The washer buckles to a desired extent when the desired torque load has been reached during the tightening of nut 21. At this stage the problem, then, is to maintain this preload condition permanently. Such condition can be accurately maintained by locking the nut 21 in a fixed position relative to the pinion shaft 26 without imposing any rotative thrust thereon during installation. This can be readily accomplished by employing a locking washer of the type disclosed herein.

The locking washer is comprised of a cup shaped member having a cylindrical body portion 30 with a radially inwardly projecting annular flange portion 31 having a central opening provided with circumferentially arranged teeth 32 which are complementary to the splines 33 on the pinion shaft. The outer end of the locking washer is provided with an annular outwardly flaring circular lip 33.

The retainer nut, in cross section, may be of hexagonal configuration and the diametric dimension measured from one apex 36 to a diametrically opposite apex 37 is greater than the inside diameter of the cylindrical cup portion 30 of the lockwasher by about .04″. Thus, when the cup portion of the lockwasher is forced by axial pressure onto the exterior surface of the nut, each of the six apex portions of the nut will dig into the interior wall of the cup portion of the lockwasher, causing adequate distortion thereof (indicated by the longitudinal beads 38) as to provide a very satisfactory locking of the washer relative to the nut. A suitable tool, not shown, would be employed to force the washer onto the nut. For example, a tool including a cylinder and an air operated ram (with a bore in its working end to accommodate the splined end of the pinion shaft) could be used. The tool would include a portion engaging the annular flange 21c on the nut so that the axial thrust imposed by the ram on the washer would be completely absorbed by the nut, alone, thereby avoiding the imposition of any disturbance to bearing preload. During the period of forcing the washer onto the nut, there is no rotative thrust imposed on the nut, consequently the rotative position of the nut relative to the pinion shaft is undisturbed—hence the preload condition of the bearings is likewise unchanged. Once the washer is forced onto the nut, there can be no subsequent change of rotative position of the nut relative to the pinion shaft, since the close mating of the pinion shaft splines and washer teeth (see FIGURE 2) prevent any possibility of even a slight change of rotative position.

As a precautionary measure for assisting in avoiding the possibility of axial shifting of the washer relative to the nut (under prolonged periods of usage of the differential assembly), I may employ an expandible lock ring 42 which, before installation on the shaft splines, has an inside diameter less than the outside diameter of such collective splines, thereby assuring a tight gripping of the splines by such ring after being forced thereonto. The ring is, of course, forced axially of the splines into tight engagement with the flange 31 of the washer.

Additionally, even if axial shifting of the washer on the nut should eventually occur, the extent of such shifting is limited because of engagement of such washer with the end wall 43 of the coupling member 44, which drivingly connects the pinion shaft (via its splines) to the driving shaft (not shown) of the vehicle. The washer would always be locked to the nut (through beads 38) for purposes of preventing rotation of the nut relative to the pinion shaft. In other words, the beads are of much greater length than the range of possible axial movement of the washer relative to the nut, hence the washer would always be locked to the six apex edges of the nut.

In the initial stage of installing the washer, the teeth 32 are brought into mating relationship with the grooves formed between adjacent splines 33. Then the washer is pushed manually until the lip 33 is against the curved rear wall 48 of the nut. Due to the close mating relationship of washer teeth and splines, the axis of the washer will always be aligned with the axis of the nut and pinion shaft, thereby assuring against any possibility of the washer becoming misaligned or cocked during the period of its being forced onto the nut.

It will be noted that the bearings F and G are of the inclined roller type wherein the cone shaped inner races 22 and 24 are inclined toward each other thereby permitting the preloading to be imposed on the bearings.

I claim:
1. A pinion shaft and bearing assembly comprising:
 (a) a housing having spaced bearing seats therein;
 (b) bearings having inner and outer races, the outer races being mounted in the seats;
 (c) a pinion shaft extending through the bearings and rotatively carried thereby, said shaft having shoulders engaged by the inner races of the bearings;
 (d) external threads on the shaft beyond one of the bearings;
 (e) an internally threaded nut on the external threads of the shaft and tightened so as to engage and impose axial thrust on the inner race of one of the bearings, thereby establishing a pre-determined torque load on the shaft supporting bearings;
 (f) a multiplicity of longitudinally extending edges on the nut and circumferentially spaced about the circumference of the nut, said edges collectively defining a circumferential path;
 (g) a locking mechanism for locking the nut against rotative movement relative to the shaft, said mechanism including a washer having a tubular portion and a substantially radially inwardly directed flange at the end of the tubular portion, the inside diameter of the tubular portion being less than the diameter of the circumferential path defined by the collective nut edges;
 (h) said tubular portion comprised of a continuous wall encircling the nut and having radially outwardly projecting beads within which the nut edges are received;
 (i) said shaft having longitudinally extending splines adjacent to and beyond the external threads;
 (j) said washer flange having an opening with circumferentially arranged teeth engageable with the splines to lock the washer against rotation relative to the shaft.

2. A pinion shaft and bearing assembly comprising:
 (a) a housing having spaced bearing seats therein;
 (b) an inclined roller type bearing mounted in each seat in oppositely inclined relationship to each other;

(c) a pinion shaft extending through the bearings and rotatively carried thereby, said shaft having shoulders engaged by the bearings;

(d) external threads on the shaft beyond one of the bearings;

(e) an internally threaded nut on the external threads of the shaft and tightened so as to impose axial thrust on one of the bearings and an oppositely directed reaction thrust on the other bearing, thereby establishing a pre-determined torque load on the shaft supporting bearings;

(f) a multiplicity of longitudinally extending apex edges on the nut and circumferentially spaced about the circumference of the nut, said edges collectively defining a circumferential path;

(g) a locking mechanism for locking the nut against rotative movement relative to the shaft, said mechanism including a washer having a tubular portion and a substantially radially inwardly directed flange at the end of the tubular portion, the inside diameter of the tubular portion being less than the diameter of the circumferential path defined by the collective nut edges;

(h) said tubular portion comprised of a continuous wall encircling the nut and having radially outwardly projecting beads extending lengthwise of the tubular portion and within which the nut edges are received;

(i) said shaft having longitudinally extending circumferentially spaced splines adjacent to and beyond the external threads;

(j) said washer flange having an opening with circumferentially arranged teeth engageable with the splines to lock the washer against rotation relative to the shaft.

3. For use in establishing and maintaining a predetermined torque loading on the supporting bearings of a pinion shaft, wherein a housing has spaced bearing seats and bearings mounted therein and wherein the pinion shaft is rotatively carried by the bearings, said shaft having shoulders engaged by the bearings and said shaft having an externally threaded portion adjacent one of the bearings and longitudinal splines beyond the threaded portion, a locking mechanism comprising:

(a) an internally threaded nut on the external threads of the shaft and tightened so as to impose axial thrust on one of the bearings, thereby establishing a pre-determined torque load on the shaft supporting bearings;

(b) a multiplicity of longitudinally extending apex edges on the nut and circumferentially spaced about the circumference of the nut, said edges collectively defining a circumferential path;

(c) a washer having a tubular portion and a substantially radially inwardly directed flange at the end of the tubular portion, the inside diameter of the tubular portion being less than the diameter of the circumferential path defined by the collective nut edges;

(d) said tubular portion comprised of a continuous wall encircling the nut and having radially outwardly projecting and longitudinally extending beads within which the nut edges are received for locking the nut against rotation relative to the washer;

(e) said washer flange having an opening with circumferentially arranged teeth engageable with the splines to lock the washer against rotation relative to the shaft.

4. For use in establishing and maintaining a pre-determined torque loading on the supporting bearings of a pinion shaft, wherein a housing has spaced bearing seats and bearings mounted therein and wherein the pinion shaft is rotatively carried by the bearings, said shaft having shoulders engaged by the bearings and said shaft having an externally threaded portion adjacent one of the bearings and longitudinal splines beyond the threaded portion, a locking mechanism comprising:

(a) an internally threaded nut on the external threads of the shaft and tightened so as to impose axial thrust on one of the bearings and an oppositely directed reaction thrust on the other bearing, thereby establishing a pre-determined torque load on the shaft supporting bearings;

(b) a multiplicity of longitudinally extending apex edges on the nut and circumferentially spaced about the circumference of the nut, said edges collectively defining a circumferential path;

(c) a washer having a tubular portion and a substantially radially inwardly directed flange at the end of the end of the tubular portion, the inside diameter of the tubular portion being less than the diameter of the circumferential path defined by the collective nut edges;

(d) said tubular portion comprised of a continuous wall encircling the nut and having radially outwardly projecting and longitudinally extending beads within which the nut edges are received for locking the nut against rotation relative to the washer;

(e) said washer flange having an opening with circumferentially arranged teeth engageable with the splines to lock the washer against rotation relative to the shaft;

(f) means limiting axial movement of the washer relative to the shaft to prevent dislodgement of the washer beads relative to the nut edges.

5. Apparatus as set forth in claim 4 wherein an outwardly flared lip is formed on the washer at the end opposite from the flange end.

6. Apparatus as set forth in claim 4 wherein the length of the washer beads is greater than the distance from the washer flange to the means which limit axial movement of the washer.

7. For use in establishing and maintaining a pre-determined torque loading on the supporting bearings of a pinion shaft, wherein a housing has spaced bearing seats and bearings mounted therein and wherein the pinion shaft is rotatively carried by the bearings, said shaft having shoulders engaged by the bearings and said shaft having an externally threaded portion adjacent one of the bearings and longitudinal splines beyond the threaded portion, a locking mechanism comprising:

(a) an internally threaded nut on the external threads of the shaft and tightened so as to impose axial thrust on one of the bearings and an oppositely directed reaction thrust on the other bearing, thereby establishing a pre-determined torque load on the shaft supporting bearings;

(b) a multiplicity of longitudinally extending apex edges on the nut and circumferentially spaced about the circumference of the nut, said edges collectively defining a circumferential path;

(c) a washer having a tubular portion and a substantially radially inwardly directed flange at the end of the tubular portion, the inside diameter of the tubular portion being less than the diameter of the circumferential path defined by the collective nut edges;

(d) said tubular portion comprised of a continuous wall encircling the nut and having radially outwardly projecting and longitudinally extending beads within which the nut edges are received for locking the nut against rotation relative to the washer;

(e) said washer flange having an opening with circumferentially arranged teeth engageable with the splines to lock the washer against rotation relative to the shaft;

(f) a locking ring encircling the splines and engaging the washer flange to resist axial movement of the washer relative to the splines.

(References on following page)

References Cited

UNITED STATES PATENTS

| | | | |
|---|---|---|---|
| 606,582 | 6/1898 | Rohlin | 151—29 |
| 1,002,774 | 9/1911 | Stouffer. | |
| 2,332,684 | 10/1943 | Armitage | 308—207 |
| 2,548,258 | 4/1951 | Griffith | 74—607 X |
| 2,735,315 | 2/1956 | Zenker | 74—607 |
| 2,895,315 | 7/1959 | Fishtahler. | |
| 2,955,885 | 10/1960 | Storch | 308—236 |
| 3,156,506 | 11/1964 | Scheifele et al. | 308—211 |

FOREIGN PATENTS

| | | |
|---|---|---|
| 496,832 | 12/1938 | Great Britain. |

FRED C. MATTERN, JR., *Primary Examiner.*

DAVID J. WILLIAMOWSKY, *Examiner.*

J. A. WONG, *Assistant Examiner.*